(12) United States Patent  
Sudhakar

(10) Patent No.: US 8,185,884 B2  
(45) Date of Patent: May 22, 2012

(54) SYSTEM AND METHOD FOR OFFLINE UPDATION OF SOFTWARE IN VIRTUAL MACHINE (VM) IMAGES

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 1003 days.

(21) Appl. No.: 12/144,419

(22) Filed: Jun. 23, 2008

(65) Prior Publication Data

US 2009/0320014 A1    Dec. 24, 2009

(51) Int. Cl.  
*G06F 9/44* (2006.01)

(52) U.S. Cl. .................................................. 717/169

(58) Field of Classification Search .............. 717/171, 717/130, 169; 718/1  
See application file for complete search history.

(56) References Cited

U.S. PATENT DOCUMENTS

| 7,062,764 | B2 | 6/2006 | Cohen et al. | |
| 2003/0233644 | A1* | 12/2003 | Cohen et al. | 717/171 |
| 2006/0075076 | A1* | 4/2006 | Sinha | 709/220 |
| 2007/0033578 | A1* | 2/2007 | Arnold et al. | 717/130 |
| 2007/0271561 | A1* | 11/2007 | Winner et al. | 718/1 |
| 2009/0007105 | A1* | 1/2009 | Fries et al. | 718/1 |
| 2009/0064124 | A1* | 3/2009 | Chung | 717/168 |

* cited by examiner

*Primary Examiner* — Don Wong  
*Assistant Examiner* — Lynda Dinh  
(74) *Attorney, Agent, or Firm* — Haynes and Boone, LLP

(57) ABSTRACT

System and method for offline management of software in VM images are described. In one embodiment, the method includes obtaining updation-related information from the software application and an operating system in which the software application runs while the software application is in an online mode, writing the updation-related information to a first set of files of a virtual machine (VM) image while the software application is in the online mode, reading the updation-related information from the first set of files of the VM image while the software application is in an offline mode; using the read updation-related information to update the software application while the software application is in the offline mode; and writing post-updation files to a second set of files of the VM image using the updation-related information read from the first set of files while the software application is in the offline mode.

18 Claims, 5 Drawing Sheets

SYSTEM AND METHOD FOR OFFLINE UPDATION OF SOFTWARE IN VIRTUAL MACHINE (VM) IMAGES

BACKGROUND

A virtual machine ("VM") is a software simulation of a computer that runs on a host computer, but behaves as if it were a separate, independent, computer. Multiple VMs can be run on a single host computer. OS virtualization is achieved by inserting a layer of software, referred to as the virtualization layer or "hypervisor," between the OS and the underlying server hardware. The hypervisor is responsible for enabling multiple OS images and their respective applications to share the resources of a single computer, such that each OS image functions as if it has at its disposal all of the resources of the computer, while the hypervisor transparently ensures that the system's resources are properly shared among the different OS images and their applications.

A VM generally comprises a configuration file and one or more disk or image files. The configuration file contains information needed by the hypervisor to run the VM, as well as information identifying the virtual resources required by the VM. The image files comprise the actual operating system and application files.

In certain applications, it is common to maintain multiple VM images of which only a few are in an online state (or running state), while the remaining are in an offline state. For example, Microsoft allows keeping hundreds of images of software irrespective of the number of licenses. However, it allows, at any time, only as many active instances of the software as the number of licenses. The VM images often need maintenance, such as installation, uninstallation, and updation of software. For instance, there may be need for installation, uninstallation, and/or updation of anti-virus definitions in offline VM images. In such scenarios, a significant amount of time and effort is required to bring each offline VM image online and then update the software.

SUMMARY

One embodiment is a method of updating a software application. The method comprises obtaining updation-related information from the software application and an operating system in which the software application runs, while the software application is in an online mode; writing the updation-related information to a first set of files of the VM image, while the software application is in the online mode; reading the updation-related information from the first set of files of the VM image while the software application is in an offline mode; using the read updation-related information to update the software application while the software application is in the offline mode; and writing post-updation files to a second set of files of the VM image using the updating-related information read from the first set of files, while the software application is in the offline mode.

DETAILED DESCRIPTION

This disclosure relates generally to offline management of software in virtual machine ("VM") images and, more specifically, to offline installation, uninstallation and/or updation of the software in such VM images.

It should be noted that the description and the accompanying drawings show only those specific details that are pertinent to understanding the embodiments of the present invention. The disclosure is not obscured with details that will be readily apparent to those of ordinary skill in the art. Additionally, as used herein, relational terms such as first, second, third and fourth, and the like, may be used solely to distinguish one entity or action from another entity or action, without necessarily requiring or implying any sequential relationship or order among such entities or actions.

Although specific embodiments are described herein, one of ordinary skill in the art will appreciate that various modifications and changes can be made without departing from the spirit and scope of the present disclosure and the appended claims. One embodiment relates to offline management of software in Virtual Machine (VM) images. The offline management of software may include offline installation, uninstallation and/or modification (hereinafter, collectively, "updation") of the software.

As used herein, the term "system" refers to an assembly of constituent elements, such as hardware, software and firmware, coupled to operate in coordination. The phrase "application is aware of offline updation and offline updates" means that parts of application software are coded/re-coded to support offline updation by writing to and reading from the special files (SFs) discussed later.

Figure 1:
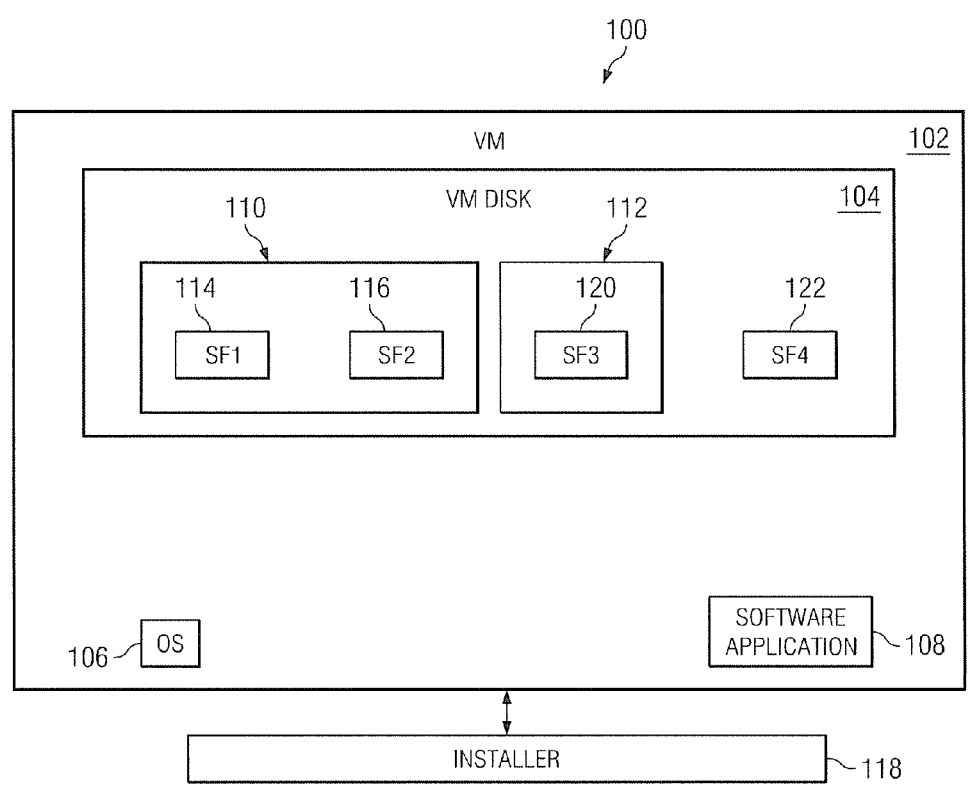
FIG. 1 depicts a block diagram of an exemplary system for facilitating offline updation of software in VM images.

FIG. 1 depicts a system 100 for facilitating offline updation of software in VM images in accordance with one embodiment. The system 100 comprises a VM 102 that includes a VM image, or VM disk, 104, one or more OSes, represented in FIG. 1 by an OS 106, one or more software applications that run in the OS 106 (for example, antivirus software, etc.), represented in FIG. 1 by a software application 108. The VM disk 104 includes a first set of files 110 comprising a first file 114 ("SF1") and a second file 116 ("SF2"), a second set of files 112 comprising a third file 120 ("SF3"), and a fourth file 122 ("SF4"). The system 100 further includes an installer 118 for installing files to the VM disk 104, as will be described in greater detail below.

The VM disk 104 is a disk in the VM 102 that is mapped to either a physical disk drive or a partition on a host machine. Thus, the VM disk 104 can be partitioned and formatted like real hard disk. In one embodiment, the VM disk 104 is stored as a file on a file system of the VM 102. Accordingly, the VM disk 104 is a file or set of files that appears as a physical disk drive to a guest OS.

As will be described in greater detail below, in one embodiment, the installer 118 writes to the fourth file 122 a flag that is required by the software application 108 to signify that updation has occurred while the software application is in the offline mode. As will also be described, the software application 108 reads the flag from the fourth file 122 while the software application is in the offline mode. In an alternative embodiment, the flag may be written to and read from the second file 116.

As will also be described in greater detail below, updation-related information for the OS 106 and the software application 108 is written to the first set of files 110. In one embodiment, updation-related information for the OS 106 is written to one of the files 110 (e.g., the first file 114), while updation-related information for the software application 108 is written to the other one of the files 110 (e.g., the second file 116). In another embodiment, a single one of the files 110 (e.g., the first file 114) may be used to store the updation-related information obtained from both the software application 108 and the OS 106.

The updation-related information obtained from the OS 106 may include information required by the installer 118 for updation of the software application 108. Such information may include, for example, a list of installed programs, versions of the installed programs, registry values of the installed programs, and/or version information about the OS 106. Registry values are name/data pairs stored within registry keys. The registry values are referenced separately from the registry keys. In contrast, the updation-related information obtained from the software application 108 may include information required by the installer 118 for updation of the software application 108. Such information may include, for example, one or more of registry values, version information about the software application 108, and/or version of the internal files.

As will be described in greater detail below, in one embodiment, information required by the OS 106 after updation of the software application 108 ("post-updation information") is stored in the third file 120. Examples of such information include, for example, the latest version number of updates installed/uninstalled/updated, and the like, along with their corresponding paths.

As used herein, the terms "flag" and "updation/installation/uninstallation completion flag" refer to a code with an assigned meaning that is read by the software application when the VM comes back online after offline updation of the software application to prompt the software application to perform necessary post-updation operations before servicing a user. Similarly, the term "post-updation files" is used herein to refer to one or more files containing information required by the OSes when the VM comes back online after offline updation of the software application.

As enabled by features of one embodiment, the software application 108 is aware of the offline updation process. As has been previously mentioned and as will be described in greater detail below with reference to FIG. 2A, the software application 108 is adapted to write updation-related information required by the installer 118 for updation of the software application to the first set of files 110 while the software application is in an online mode. In addition, as has been previously mentioned and as will be described in greater detail below with reference to FIG. 2C, the software application 108 is adapted to read the flag from either the first set of files 110 or the fourth file 122 while the software application 108 is in the online mode.

The OS 106 provides a platform to run the software application 108. As enabled by features of one embodiment, the OS 106 is aware of the offline updation process. As has been previously mentioned and as will be described in greater detail below with reference to FIG. 2A, the OS 106 is adapted to write information required by the installer 118 to the first set of files 110 while the software application 108 is in the online mode. Additionally, as has been previously mentioned and as will be described in greater detail below with reference to FIG. 2A, the OS 106 is adapted to read information required by the OS 106 to perform post-updation processes from the second set of files 112 while the software application is in the online mode.

In the context of this disclosure, the terms "online" and "offline" refer to states or conditions of a VM image of a software application. The VM image is in an online mode when it is "running" or "executing". On the other hand, the VM image is in an offline mode when it is not running, i.e., it is simply being stored on a storage device accessible by the machine on which it may be deployed The term software update, or "patch," generally refers to a piece of software or new release designed to update or fix problems or bugs in a computer program and/or to include changes to accommodate new OSes. The phrase "software updation," as used herein, includes within its meaning modification, installation, and uninstallation of a software application.

In one embodiment, the installer 118 may possess, among other functionalities, the functionality of a software updation program. In another embodiment, the installer 118 may be capable of functioning in three distinct operation modes, namely, installation, uninstallation, and updation. As shown in the FIG. 1, the installer 118 may reside outside the VM 102. As will be described in greater detail below with reference to FIG. 2B, the installer 118 is adapted to retrieve the updation-related information from the first set of files 110 while the software application 108 is in an offline mode. Additionally, as further will be described in greater detail below with reference to FIG. 2B, the installer 118 is adapted to write post-updation files to the second set of files 112 using the updation-related information read from the first set of files 110 while the software application is in an offline mode. Still further, as will be described in greater detail below with reference to FIG. 2B, the installer is adapted to write an updation completion flag to a file, such as the second file 116 or the fourth file 122 upon completion of updation of the software application 108 while the software application is in an offline mode.

Figure 2A:
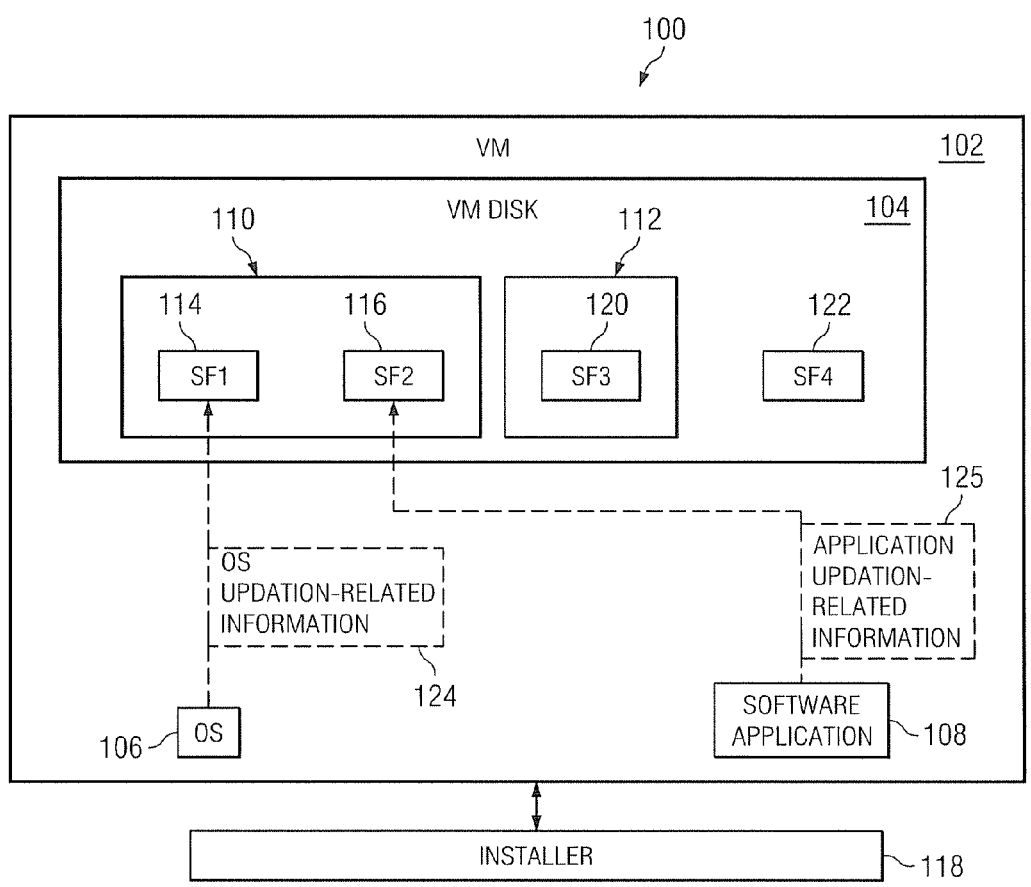
FIG. 2A depicts a snapshot of the exemplary system of FIG. 1, before the offline software updation phase.

FIG. 2A depicts a snapshot of the exemplary system of FIG. 1, immediately prior to performance of the offline software updation process. As illustrated in FIG. 2A, updation-related information 124 for the OS 106 as required by the installer 118 is written to the first file 114 and updation-related information 125 for the software application 108 as required by the installer 118 is written to the second file 116 while the software application 108 is in the online state. In an alternative embodiment, the updation-related information 124, 125, may be written to a single one of the files 110.

Figure 2B:
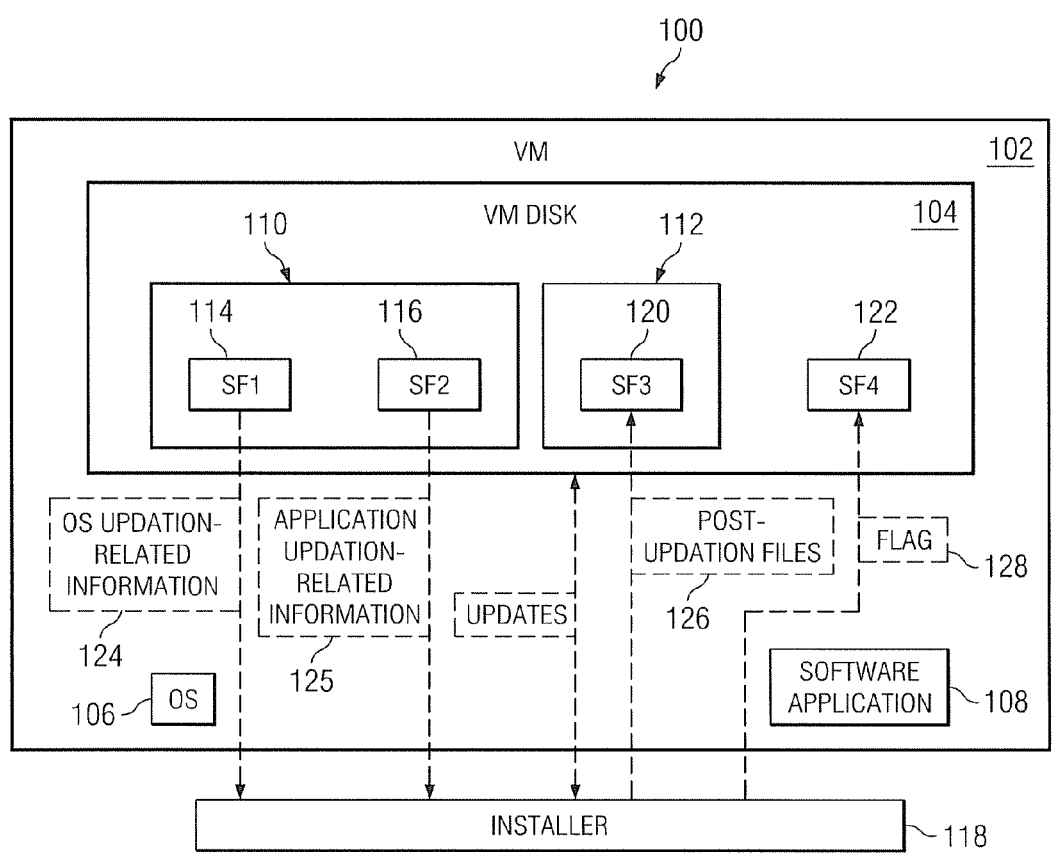
FIG. 2B depicts another snapshot of the exemplary system, during the offline software updation phase.

FIG. 2B depicts a snapshot of the exemplary system of FIG. 1, during the offline software updation process. As illustrated in FIG. 2B, the installer 118 reads the updation-related information 124, 125, from the first set of files 110 while the software application is in the offline mode. The installer 118 then writes post-updation files 126, which are files required by the OS 106 after installing, uninstalling or updating the software application 108, to the third file 120 of the second set of files 112 using the updation-related information 124, 125, read from the first set of files 110 while the software application 108 is in the offline mode. This will result in one of updation (i.e., installation, uninstallation, or modification) of the software application 108.

Upon completion of the updation of the software application 108, while the software application 108 is offline, the installer 118 writes a file containing a flag 128 (e.g. an updation completion flag) indicating that the updation has been completed. In one embodiment, the file containing the flag 128 comprises the fourth file 122. In another embodiment, the flag 128 is written to the first set of files 110. In yet another embodiment, the file containing the flag 128 may be a member of the first set of files 110.

Figure 2C:
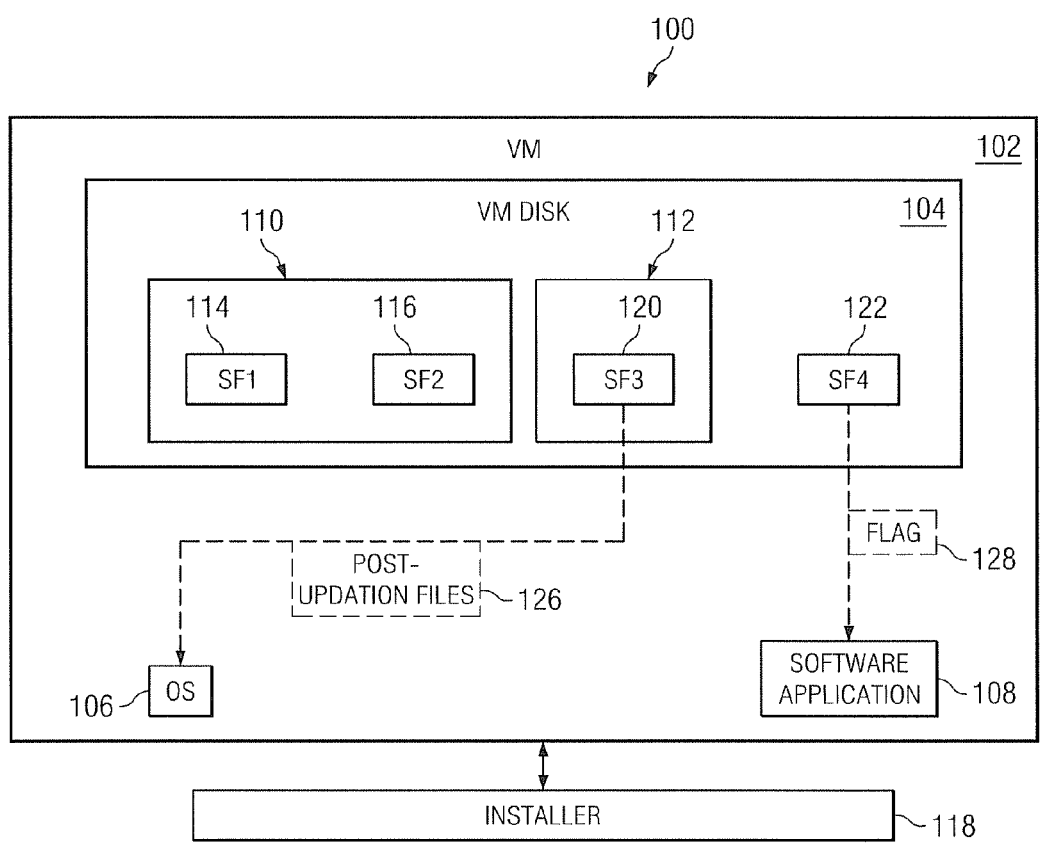
FIG. 2C depicts another snapshot of the exemplary system, after the offline software updation phase.

FIG. 2C depicts yet another snapshot of the exemplary system of FIG. 1 immediately after the offline software updation phase; that is, when the VM comes back online and the software application 108 is in the online mode. As shown in FIG. 2C, the OS 106 reads the post-updation files 126 stored in the third file 120. Similarly, the software application 108 reads the flag 128 from the fourth file 122 (or from the second file 116 in an embodiment in which the flag 128 has been written thereto). The information obtained by the OS 106 and the software application 108 in the post-offline updation process illustrated in FIG. 2C enable both elements to perform any necessary post-updation procedures.

Figure 3:
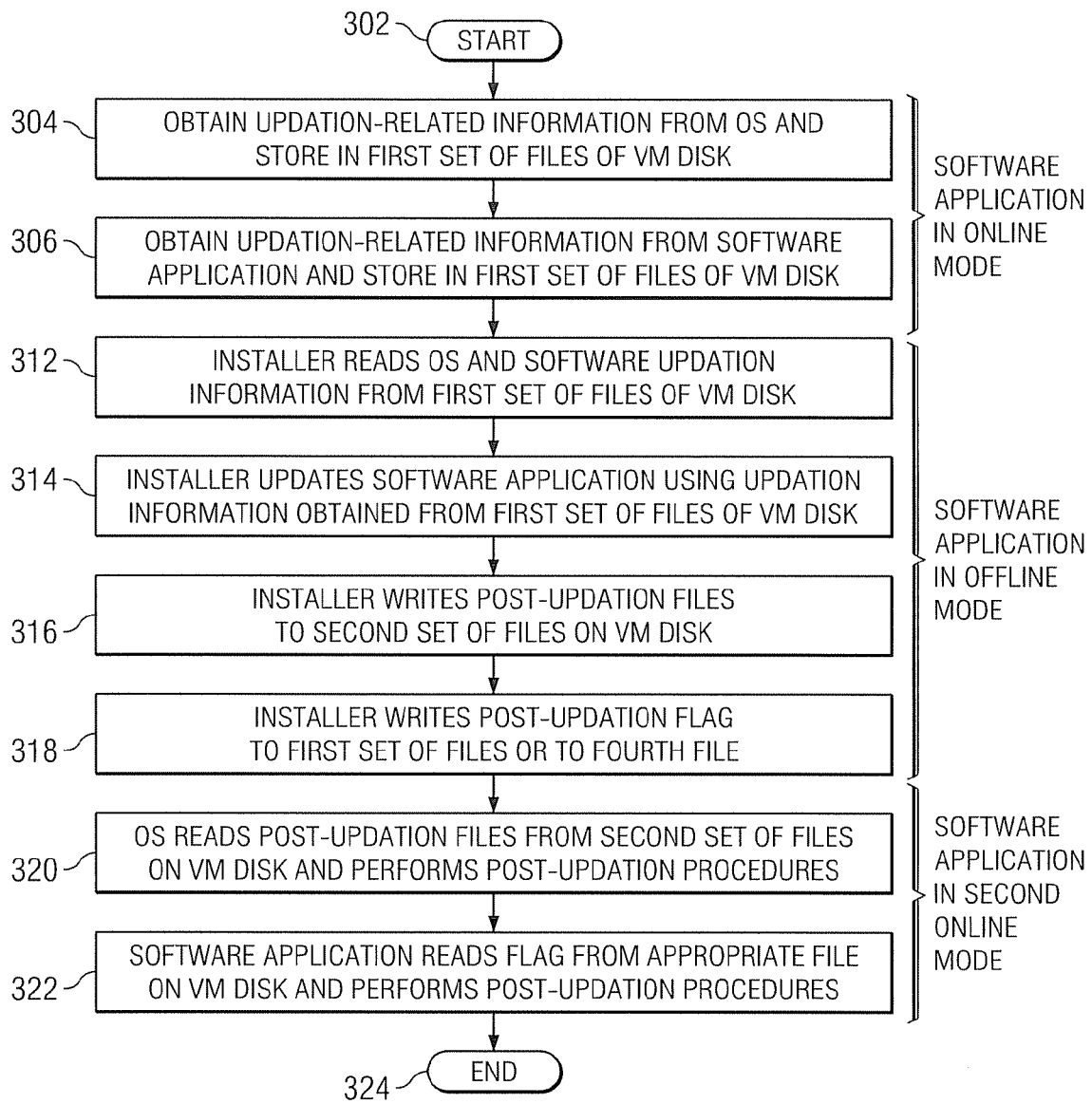
FIG. 3 depicts a flow diagram the operation of the system illustrated in FIG. 1 in accordance with one embodiment.

FIG. 3 depicts a flow diagram of an exemplary method for offline updation, installation, and/or uninstallation of a software application. Execution begins in step 302. In step 304, updation-related information is written from the OS to a first special file (SF1) of the VM disk while the software application is in an online state. In step 306, updation-related information is written from the software application to a second special file (SF2) of the VM disk while the software application is in an online state. It will be recognized that steps 304 and 306 may be executed in reverse order or substantially simultaneously with one another.

In step 312, the updation-related information written to the first set of files in steps 304 and 306 is read by the installer while the software application is in an offline state. In step 314, the updation-related information read in step 312 is used by the installer to update the software application while the software application is in an offline state.

In step 316, the post-updation files are written by the installer to the second set of files of the VM image by the installer using the updation-related information includes information from the first and second files of the first set of files, read in the steps 304 and 306. In step 318, the file containing the flag is written by the installer to the VM disk. In one embodiment, the flag is written to the first set of files. In another embodiment, the flag is written to the fourth file. In step 320, the post-updation files are read by the OS from the second set of files of the VM image. In step 322, the flag is read by the software application from the file on the VM disk in which it is stored. In one embodiment, the flag is read by the software application to verify and ensure whether offline updation of the software application has been completed. Execution terminates in step 324.

It is understood that modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

When definite features, structures, or characteristics are described in connection with any set of embodiments, it is understood that it is within the ability of one skilled in the art to use such features, structures, or characteristics in connection with other embodiments.

Although embodiments have been described with reference to a number of illustrative embodiments, it should be understood that numerous other modifications and embodiments can be devised by those skilled in the art that will fall within the spirit and scope of the principles of the disclosure. The illustrative embodiments described above are for explanatory purposes only, and not intended to limit the scope of the embodiments described herein. More particularly, various variations and modifications are possible in the component parts and/or arrangements of the parts within the scope of the disclosure, the drawings, and the appended claims. In addition, alternative uses will also be apparent to those skilled in the art.

What is claimed is:

1. A method of updating a software application, the method comprising:
   obtaining updation-related information from the software application and an operating system in which the software application runs while the software application is in an online mode;
   writing the updation-related information to a first set of files of a virtual machine (VM) image while the software application is in the online mode;
   reading the updation-related information from the first set of files of the VM image while the software application is in an offline mode;
   using the read updation-related information to update the software application while the software application is in the offline mode;
   writing post-updation files to a second set of files of the VM image using the updating-related information read from the first set of files while the software application is in the offline mode; and
   writing an updation completion flag to a file on the VM image,
   wherein while the software application is in a second online mode subsequent to the offline mode the operating system reads the post-updation files from the second set of files of the VM image and the software application reads the flag from the VM image.

2. The method of claim 1, wherein writing the updation completion flag is performed while the software application is in the offline mode to indicate completion of offline updating of the software application.

3. The method of claim 2, wherein the file to which the updation completion flag is written is a member of the first set of files.

4. The method of claim 1, wherein the first set of files comprises a first file and a second file, and wherein the updation-related information obtained from the software application is written to a first file of the first set of files and the updation-related information obtained from the operating system is written to the second file of the first set of files.

5. The method of claim 1, wherein the updation-related information obtained from the software application comprises one or more of registry values and version information about the software application.

6. The method of claim 1, wherein the updation-related information obtained from the operating system comprises version information about the operating system.

7. A computer program product comprising a non-transitory computer-readable medium having stored thereon instructions for execution by a computer for updating a software application, the instructions causing the computer to:
   obtain updation-related information from a software application and an operating system in which the software application runs while the software application is in an online mode;
   write the updation-related information to a first set of files of a virtual machine (VM) image residing on a VM disk while the software application is in the online mode;
   read the updation-related information from the first set of files of the VM image while the software application is in an offline mode;
   use the read updation-related information to update the software application while the software application is in the offline mode;

write the post-updation files to a second set of files on the VM image using the updation-related information read from the first set of files while the software application is in the offline mode; and write an updation completion flag to a file on the VM image, wherein, while the software application is in a second online mode subsequent to the offline mode, cause the operating system to read the post-updation files from the second set of files of the VM image and cause the software application to read the flag from the VM image.

8. The computer program product of claim 7, wherein writing the updation completion flag is performed while the software application is in offline mode, to indicate completion of offline updation of the software application.

9. The computer program product of claim 7, wherein the first set of files comprises a first file and a second file, the first file of the first set of files being used for writing updation-related information obtained from the software application, and the second file of the first set of files being used for writing updation-related information obtained from the operating system.

10. The computer program product of claim 7, wherein execution of the instructions for writing the post-updation files results in installation or uninstallation of the software application to the VM image.

11. The computer program product of claim 7, wherein the updation-related information obtained from the software application comprises one or more of registry values and version information about the software application.

12. The computer program product of claim 7, wherein the updation-related information obtained from the operating system comprises version information about the operating system.

13. A system for updating a software application, the system comprising:
an operating system installed on a computer;
a software application operable on the operating system and installed as a VM image on the computer;
a first set of files of the virtual machine (VM) image for storing updation-related information, while the software application is in the online mode, and reading the updation-related information, while the software application is in an offline mode;
a second set of files of the VM image for storing post-updation files, wherein the post-updation files are written using the updation-related information read from the first set of files while the software application is in the offline mode; and
a file on the VM image for writing a completion flag,
wherein, while the software application is in a second online mode subsequent to the offline mode, the operating system reading the post-updation files from the second set of files of the VM image and the software application reading the flag from the VM image.

14. The system of claim 13, wherein the file on the VM image for writing a completion flag is written to while the software application is in an offline mode, indicating completion of at least one of modification, installation, or uninstallation.

15. The system of claim 13, wherein the first set of files comprises a first file and a second file, the first file of the first set of files being used for writing updation-related information obtained from the software application and the second file of the first set of files being used for writing updation-related information obtained from the operating system.

16. The system of claim 13, wherein writing the post-updation files results in one of installation or uninstallation of the software application to the VM image.

17. The system of claim 13, wherein the updation-related information obtained from the software application comprises one or more of registry values and version information about the software application.

18. The system of claim 13, wherein the updation-related information obtained from the operating system comprises version information about the operating system.

* * * * *